(12) United States Patent
Mukherjee (10) Patent No.: US 8,981,793 B2
(45) Date of Patent: Mar. 17, 2015

(54) NON-INVASIVE LEVEL MEASUREMENT FOR LIQUID OR GRANULAR SOLIDS

(75) Inventor: Somnath Mukherjee, Milpitas, CA (US)

(73) Assignee: Fluid Management Systems, Inc, Lexington, KY (US)

( * ) Notice: Subject to any disclaimer, the term of this patent is extended or adjusted under 35 U.S.C. 154(b) by 690 days.

(21) Appl. No.: 13/084,295

(22) Filed: Apr. 11, 2011

(65) Prior Publication Data

US 2011/0248725 A1 Oct. 13, 2011

Related U.S. Application Data

(60) Provisional application No. 61/342,303, filed on Apr. 12, 2010.

(51) Int. Cl.
- *G01R 27/04* (2006.01)
- *G01F 23/284* (2006.01)
- *G01F 23/00* (2006.01)

(52) U.S. Cl.
CPC .......... *G01F 23/284* (2013.01); *G01F 23/0069* (2013.01)
USPC ....................................... 324/642

(58) Field of Classification Search
USPC .......... 324/637–624; 455/313, 318, 319, 326, 455/328
See application file for complete search history.

(56) References Cited

U.S. PATENT DOCUMENTS

| | | |
|---|---|---|
| 2,354,964 A | 8/1944 | Ostermann et al. |
| 4,044,354 A | 8/1977 | Bosher et al. |
| 4,099,167 A | 7/1978 | Pomerantz et al. |
| 4,201,085 A | 5/1980 | Larson |
| 4,489,601 A | 12/1984 | Rao et al. |
| 4,495,807 A | 1/1985 | Field et al. |
| 4,956,560 A | 9/1990 | Smith, Jr. et al. |
| 5,275,951 A | 1/1994 | Chow et al. |
| 5,423,206 A | 6/1995 | Hetzel |
| 5,437,184 A | 8/1995 | Shillady |
| 5,583,544 A | 12/1996 | Stamer et al. |
| 5,609,059 A | 3/1997 | McEwan |
| 5,797,515 A | 8/1998 | Liff et al. |
| 5,880,364 A | 3/1999 | Dam |
| 6,039,467 A | 3/2000 | Holmes |
| 6,474,156 B1 | 11/2002 | Endo et al. |

(Continued)

OTHER PUBLICATIONS

Annapurna Das, et al.; "Microwave Engineering"; Tata McGraw Hill Education Private Limited, Nagar, New Delhi, 2009.

(Continued)

*Primary Examiner* — Melissa Koval
*Assistant Examiner* — Trung Nguyen
(74) *Attorney, Agent, or Firm* — King & Schickli, PLLC (57) ABSTRACT

An apparatus and method is described for measuring non-invasively level of contents inside an array of containers without setting up any electrodes or attaching sensors around the containers, or inserting of a probe inside. Electromagnetic waves are launched from the bottom of the containers using launchers embedded in a tray the containers rest on. These waves travel through the bulk of the contents inside the container using a mode of propagation similar to dielectric waveguides or optical fibers and set up standing waves due to reflection at the content-air interface. The level inside the container is a function of the complex reflection coefficient (magnitude and phase) at the launcher input and can be thus determined by measuring the complex reflection coefficient.

17 Claims, 10 Drawing Sheets

(56) References Cited

U.S. PATENT DOCUMENTS

| | | | |
|---|---|---|---|
| 6,546,795 | B1 | 4/2003 | Dietz |
| 6,564,658 | B2 | 5/2003 | Pchelnikov et al. |
| 6,822,618 | B2 | 11/2004 | Bisiules et al. |
| 6,959,598 | B2 | 11/2005 | Peterson et al. |
| 6,962,078 | B2 | 11/2005 | Angal et al. |
| 6,964,278 | B2 * | 11/2005 | Tschanz .................. 137/392 |
| 7,258,005 | B2 | 8/2007 | Nyce et al. |
| 7,340,951 | B2 | 3/2008 | Nyce et al. |
| 7,458,260 | B2 | 12/2008 | Roesner |
| 8,467,981 | B2 | 6/2013 | Mukherjee et al. |
| 2001/0015099 | A1 * | 8/2001 | Blaine .................. 73/290 R |
| 2007/0169549 | A1 | 7/2007 | Kwun et al. |
| 2008/0036829 | A1 | 2/2008 | Nishioka et al. |
| 2008/0105331 | A1 | 5/2008 | You et al. |
| 2008/0291435 | A1 | 11/2008 | Murakami |
| 2009/0119981 | A1 * | 5/2009 | Drozd et al. .................. 44/544 |

OTHER PUBLICATIONS

Christopher P. Nemarich; "Time Domain Reflectometry Liuid Level Sensors"; IEEE Instrumentation & Measurement Magazine, Dec. 2001, pp. 40-44.

D. P. Seliskar, et al.; "Proportional Microvolume Capacitive Liquid Level Sensor Array"; Proceedings of the 2005 IEEE; Engineering in Medicine and Biology 27th Annual Conference; Shanghai, China, Sep. 1-4, 2005; pp. 7258-7261.

Dr. Somnath Mukherjee; "Non-Invasive Measurement of Liquid Content inside a Small Container"; Oral Presentation; 2010 IEEE Radio Radio & Wireless Symposium, New Orleans, USA, Jan. 13, 2010; pp. 1-23.

F. Lucklum, et al.; "Principle of a non-contact liquid level sensor using electromagentic-acoustic resonators"; Elektrotechnik and Informationstechnik, vol. 126, No. 1-2, Feb. 2009; pp. 3-4.

Gabor Vass; "The Principles of Level Measurement"; Sensors Magazine, vol. 17, Oct. 1, 2000.

Ilev, et al., All-Fiber-Optic Evanescent Liquid Level and Leak Sensor, Lasers and Electro-Optics, 1999, May 23-28, 1999, pp. 157-158.

James, et al., A Long Period Grating Liquid Level Sensor, Optical Fiber Sensors Conference Technical Digest, 2002, vol. 1, pp. 127-130.

Li et al., Development of Magnetostriction Sensor for on-line Liquid Level and Density Measurement, Intelligent Control and Automation, 2006, vol. 1, pp. 5162-5166.

R.M.A. Azzam; "Light-Reflection Liquid-Level Sensor"; IEEE Transactions on Instrumentation and Measurement, vol. 29, No. 2, Jun. 1980; pp. 113-115.

Royer, et al., A Liquid Level Sensor Using the Absorption of Guided Acoustic Waves, Ultrasonics, Ferroelectrics and Frequency Control., vol. 40, Iss. 4, Jul. 1993, pp. 418-421.

Sanchez-Galicia, et al., Acoustic-Based Liquid Level Determination in Process Vessels Using PVDF Sensors, Instrumentation and Measurement Technology Conference, 2006, Apr. 24-27, 2006, pp. 1770-1773.

Somnath Mukherjee; "Non-invasive Measurement of Liquid Content inside a Small Vial"; RWS '10 Proceedings of the 2010 IEEE Conference on Radio & Wireless Symposium; IEEE Press Piscataway, NJ, USA; pp. 527-530.

Spratt, W.K.; Vetelino, J.F., Torsional Acoustic Waveguide Sensor for Temperature and Liquid Level, Frequendy Control Symposium, 2009, Apr. 20-24, 2009, pp. 850-854.

Zheng, et al., Fast Dynamic Liquid Level Sensor Based on Liquid Resistance, AFRICON 2007, Sep. 26-28, 2007, pp. 1-6.

* cited by examiner

Dark: Weaker Field
Light: Stronger Field

Figure 7

Dark: Weaker Field
Light: Stronger Field

NON-INVASIVE LEVEL MEASUREMENT FOR LIQUID OR GRANULAR SOLIDS

CROSS-REFERENCES TO RELATED APPLICATIONS

This application claims priority to U.S. Provisional Patent Application No. 61/342,303 filed Apr. 12, 2010 entitled "Non-invasive Level Measurement for Liquid or Granular Solids", which is hereby incorporated by reference in its entirety.

BACKGROUND

This invention relates generally to the field of sensors for the measurement of level of liquid or granular solid in an array of containers where it is physically not possible to insert a probe inside each container, surround the container with launching electrodes, or attach sensors to walls. More particularly, it relates to the field of level sensors where an electromagnetic wave is launched from the outside of the container and the reflected signal processed to extract the information about liquid level.

Level of liquid or granular solid inside containers e.g. bottles, vials etc. need to be monitored for hospitality, pharmaceutical, healthcare, industrial and other areas. A common example is monitoring the amount of drink inside beverage bottles in bars. Every year a significant amount of beverage is lost due to shrinkage that needs to be checked. Furthermore, multiple beverage containers, located in trays and shelves need to be monitored in an economic and timely fashion for inventory.

Prior art e.g. weighing of individual containers to determine content is an expensive proposition since as many force sensors are required as the number of containers. Capacitive or transmission line sensors are economic but need conducting electrodes around the containers. Invasive techniques e.g. inserting a probe in the container are not acceptable due to cost and inconvenience.

Prior art U.S. Pat. No. 6,564,658 teaches the use of slow-wave structures to measure liquid level and teaches the confinement of electromagnetic energy in a small volume. One embodiment of the invention teaches liquid level measurement by placing the electrodynamic element outside the container. However, the fields generated by the electrodynamic element can attain only partial penetration and not throughout the bulk of the liquid. As a result, this method is unlikely to provide the adequate sensitivity in many applications.

Thus, a better solution is needed to accurately measure level of liquid or granular solid inside containers where neither electrodes or sensors around the container cannot be used, nor a probe be inserted. Furthermore, the solution needs to amenable to measuring multiple containers in an array and yet be economic. All of the said features are provided by the following invention.

SUMMARY

Embodiments of the present technique provide a method and apparatus for non-invasive level measurement for liquid or granular Solids, where the said liquid or granular solid is stored in a container made from electrically non-conducting material such as glass, plastic, paper, wood etc.

In one embodiment, the present invention provides a system consisting of a intelligent tray that is capable of accommodating at least one container the level of contents inside which needs to be monitored. The containers rest on the intelligent tray and each container is served by a launcher for launching electromagnetic waves. The launchers are embedded in the tray, are electrically passive and constructed from electrically conducting and dielectric materials. When more than one container is present on the tray, a switching arrangement selectively connects each launcher (each serving a container) to the measurement system.

In one embodiment, the present invention provides a system for measuring complex reflection coefficient (magnitude and phase) of electromagnetic waves. The measurement system (reflectometer) consists of radio frequency generator, directional couplers, magnitude/phase detectors and processor. A radio frequency wave is launched into a particular container using a launcher, and the wave travels through the body of the material located inside the container. The mode of propagation is not Transverse-electric-magnetic (TEM) and bears resemblance to propagation inside dielectric waveguide or optical fiber. At the interface of the contents and air, the wave suffers a reflection and travels back again through the bulk of the liquid thereby creating standing waves inside the container. The reflected wave finally appears at the launcher input and therefore affects the complex reflection coefficient at that point. By measuring the complex reflection coefficient at the launcher input, it is therefore possible to determine the level of contents inside the container.

In one embodiment, the present invention provides a switching arrangement for selectively connecting each launcher to the reflectometer.

These and other embodiments of the invention are described in further detail below.

DETAILED DESCRIPTION OF THE INVENTION

Figure 1:
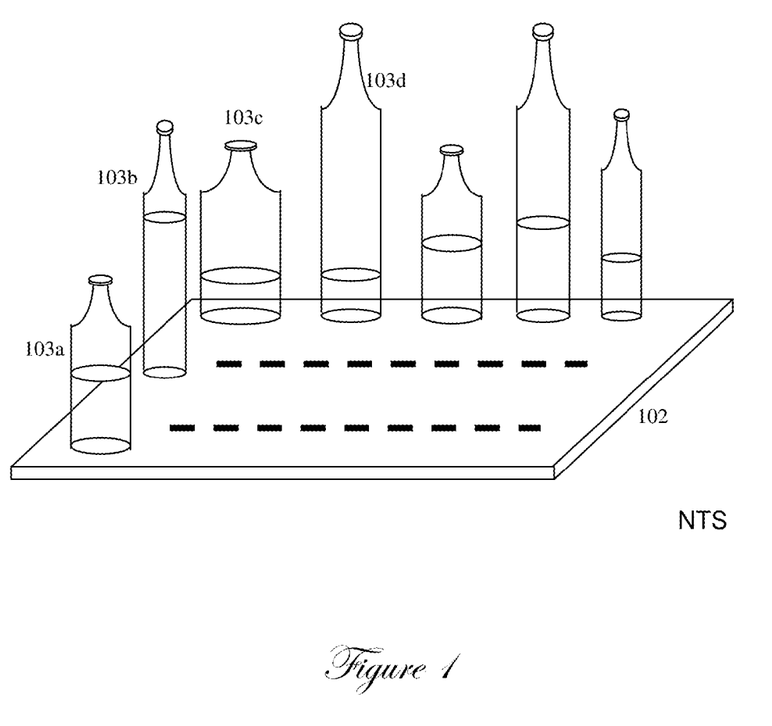
FIG. 1 illustrates a typical intelligent tray with multiple beverage containers

FIG. 1 depicts a typical construction of a intelligent tray 102 capable of accommodating multiple containers 103a, 103b, 103c, 103d and so on. The containers might be of different sizes and shapes. The measurement apparatus (reflectometer) may be integrated with the tray 102 or be separate from it. The goal of the apparatus is to measure liquid content in each container automatically and non-invasively.

Figure 2:
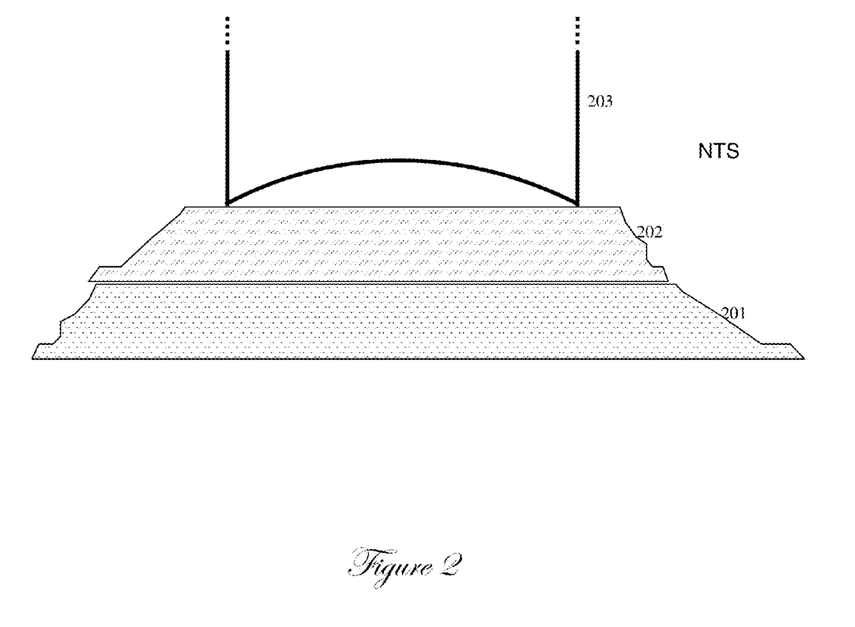
FIG. 2 depicts a intelligent tray that can installed on the top of an existing shelf

FIG. 2 depicts a portion of the intelligent tray 202 laid out over an existing shelf 201. A container, e.g. a beverage bottle 203 rests on the intelligent tray 202.

Figure 3:
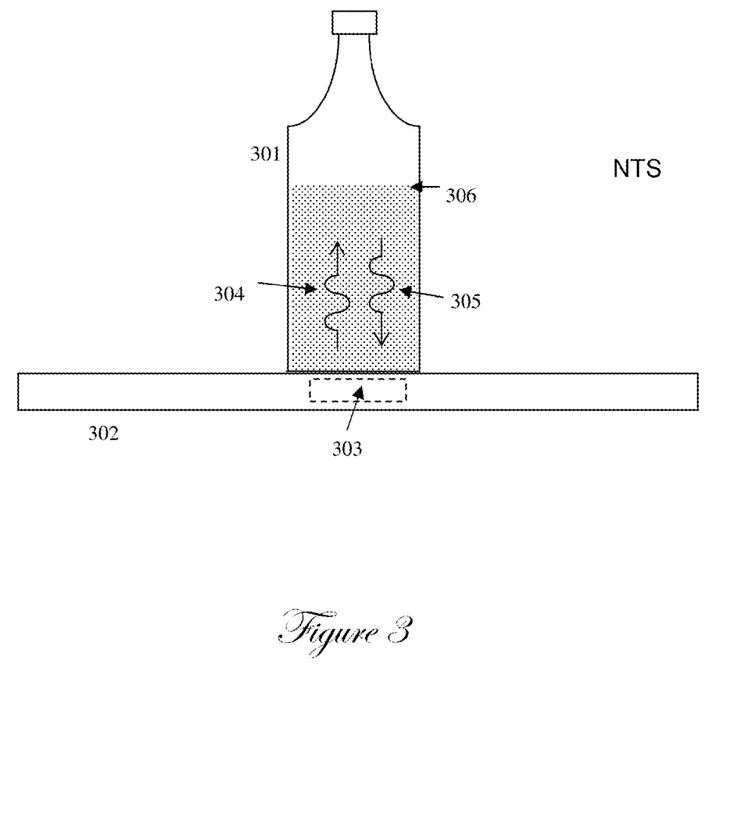
FIG. 3 depicts a typical beverage container on a intelligent tray with electromagnetic waves launched at the bottom of the container

FIG. 3 depicts a container 301 resting on a intelligent tray 302. A launcher 303 is embedded inside the intelligent tray 302 and is used to launch electromagnetic waves 304 inside the container 301. The incident wave 304 gets reflected at the interface between contents and air 306 due to a mismatch of dielectric constants and creates a reflected wave 305.

Figure 4:
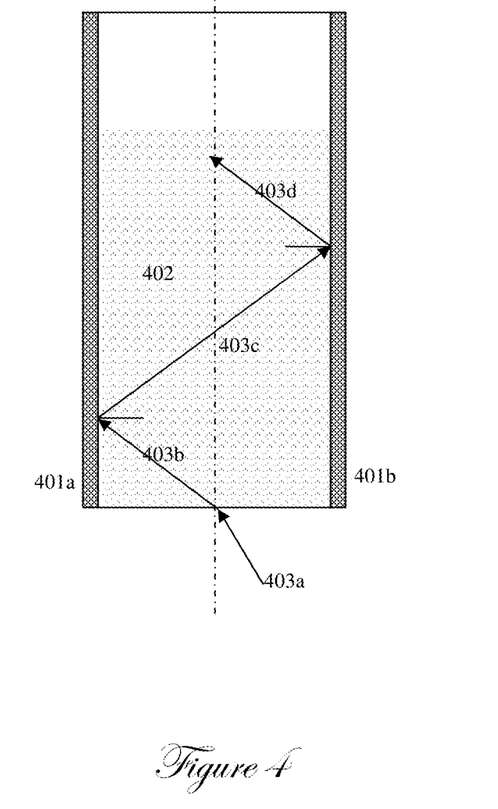
FIG. 4 depicts simplistic representation (geometrical optics) of waves through a dielectric material suffering total internal reflection

FIG. 4 depicts a simplified illustration of the mechanism of launching electromagnetic waves inside a container, whose walls are represented by 401a and 401b, and the contents inside are designated by 402. The dielectric constant of the contents is assumed to be higher than that of the walls of the container. A wave launched within a range of certain angles would propagate through 402 by total internal reflection as shown by ray segments 403a, 403b, 403c and 403d. The reflected wave is not shown. This geometrical optics representation is valid only if the wavelength is small compared to the cross-sectional dimensions of the container. In practice, the said condition is usually not valid and a rigorous solution to Maxwell's equations is necessary to solve for fields in and out of the container. The relative values of the dielectric constants of the contents and container will determine how the electric and magnetic fields will be distributed inside the contents, within the container walls, and also the surrounding air. However, the geometrical optics representation of total internal reflection is used here just for a general understanding.

Figure 5:
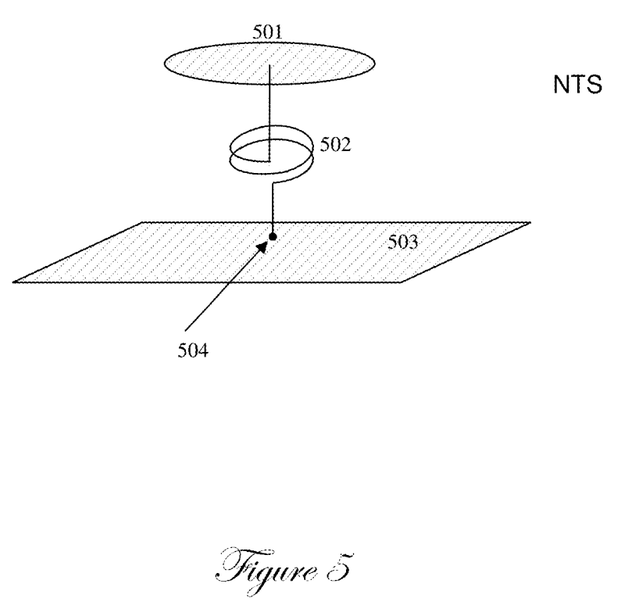
FIG. 5 depicts one embodiment of the launcher for launching Transverse Magnetic waves

FIG. 5 depicts an embodiment of the launcher mentioned as 303 in FIG. 3. The launcher consists of a ground plane 503, a monopole 502 and a top hat 501 mounted on the top of the monopole 502. The monopole may be a straight element, but to conserve space and reduce the thickness of the intelligent tray, parts of it may be constructed from helical and/or spiral elements. The top hat 501 may be rectangular, circular or some other suitable shape. The radio frequency signal is launched between the ground plane 503 and monopole 502, at the point designated 504. This type of launcher can be used to launch Transverse Magnetic Waves.

Figure 6:
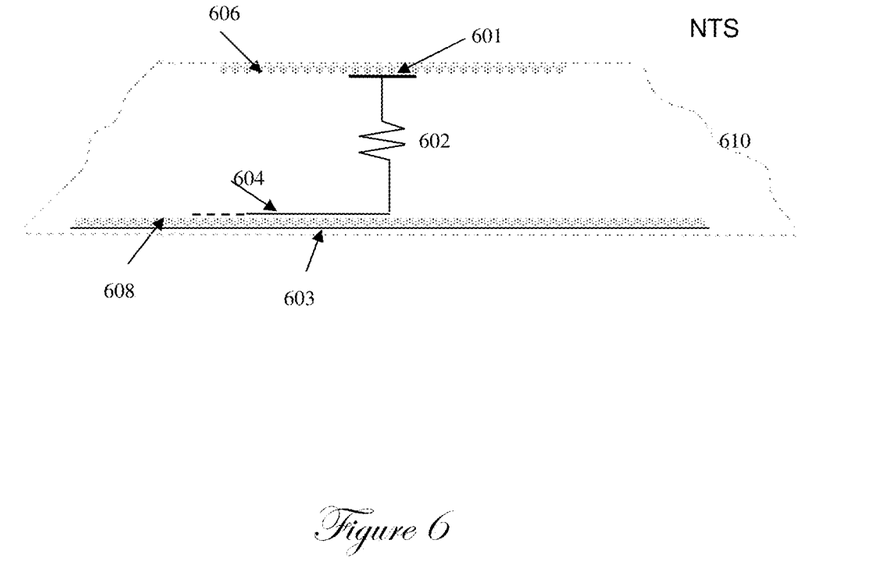
FIG. 6 depicts cross-section of intelligent tray with embedded launcher for launching Transverse Magnetic waves

FIG. 6 depicts the launcher of FIG. 5 embedded in a intelligent tray 610 (side view). The ground plane, monopole and top hat are represented by 603, 602 and 601 respectively. A microstrip trace 604 is used for feeding the signal. 608 is the dielectric material between the ground plane 603 and microstrip trace 604. There is a dielectric layer 606 above the top hat 601 for physical protection.

Figure 7:
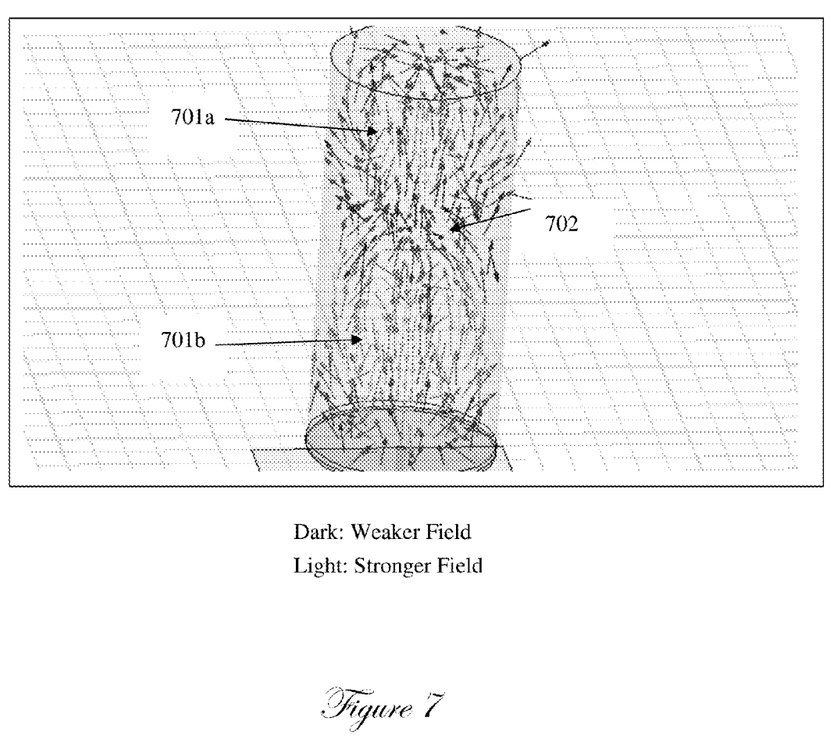
FIG. 7 depicts simulation showing TM01 waves launched in a container (electric field)

FIG. 7 shows the electrical field from a simulation exercise. The simulation used a container with radius 10 mm, negligible wall thickness and height 75 mm. Water (dielectric constant=81) was used as contents. Mode TM01 was launched at 1990 MHz inside the container. Due to reflection at air-water interface, standing waves were created, and we observe the maxima at 701a and 701b and a minimum at 702. It is also observed that the wavelength is considerably larger than an unbounded TEM wave in the same material due to the non-TEM nature of propagation.

Figure 8:
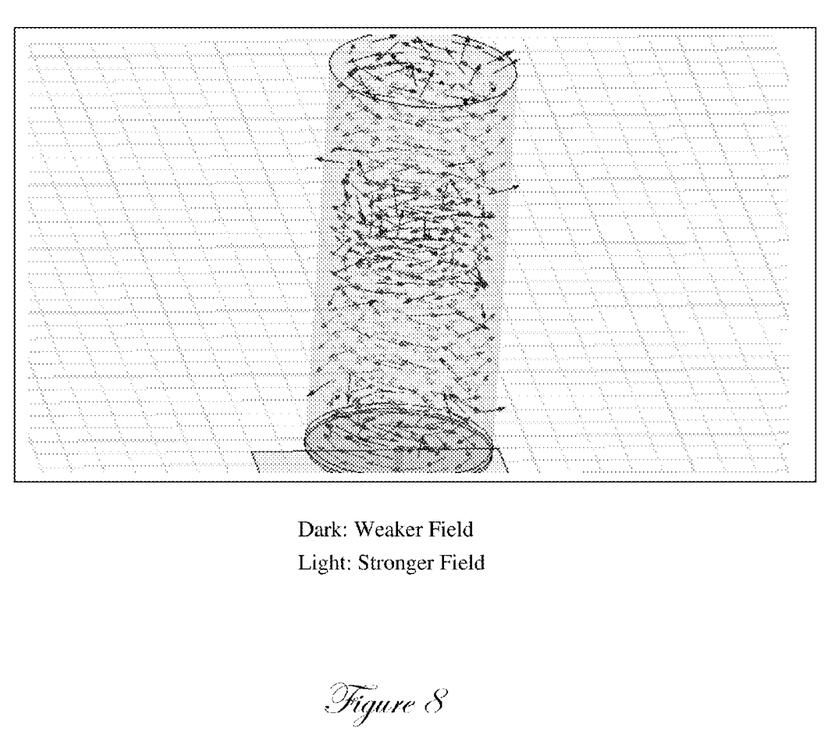
FIG. 8 depicts simulation showing TM01 waves launched in a container (magnetic field)

FIG. 8 depicts the magnetic field from same simulation as in FIG. 7. We observe the transverse nature of the magnetic field and also the maxima and minima at the same regions corresponding to the electric field.

Figure 9:
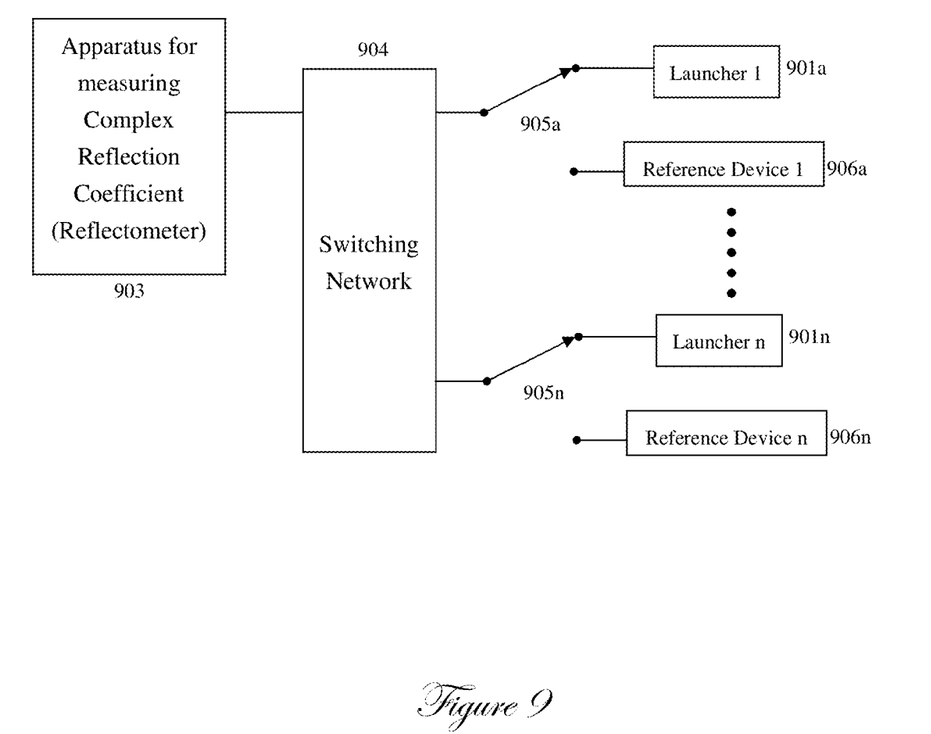
FIG. 9 is a block diagram of the switching and calibration technique for a plurality of launchers in a intelligent tray

FIG. 9 depicts a method for using a common measurement apparatus 903 to characterize multiple launchers 901a through 901n through a switching network 904. The said apparatus (reflectometer) 903 is capable of measuring complex refection coefficient (i.e. magnitude and phase of reflected wave referenced to the transmitted wave) at different frequencies. To remove the effect of the switching network 904 and various lengths of transmission line, a calibration method is used. The said calibration can be performed by one or more reference devices 906a through 906n located in close proximity to the launchers 901a through 901n. There may be more than one type of reference device if required. Switches 905a through 905n are used to switch between a launcher and its corresponding reference device(s). Based on the complex reflection data from a reference device(s), the complex reflection coefficient of the launcher alone—minus the effect of the switching network—can be computed as follows.

Let the reference circuit elements be 'open', 'short' and 'matched termination' and let o, s and l be the corresponding complex reflection coefficients measured by the measurement apparatus. Let us define $$s1 \qquad (1)$$
$$s22 = (o + s - 2\ s\ o\ s\ s$$
$$s12 = (1 - s22) \cdot (o - s$$

Let be the measured complex reflection coefficient for the launcher. The calibrated (i.e. corrected for feed line and switching network) complex reflection coefficient con is given by $$\text{corr} = [-s\ s\ s\ s$$

Figure 10:
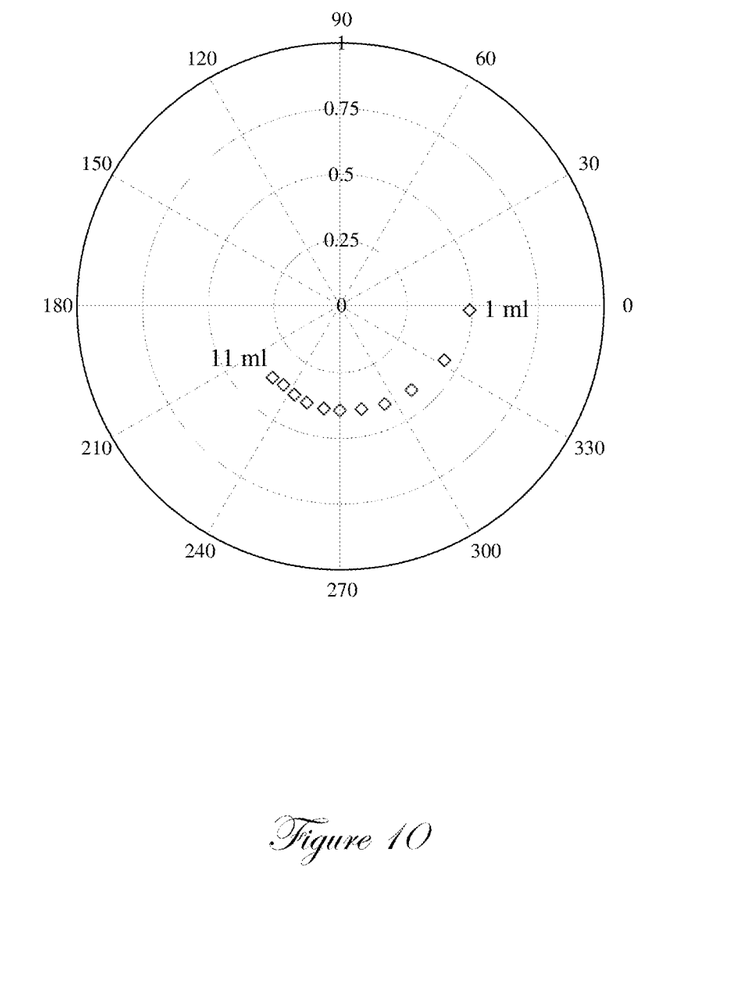
FIG. 10 depicts experimental data obtained by changing liquid level inside a container

FIG. 10 depicts experimental results by changing the water level in a plastic container of radius 10 mm. A launcher as in FIG. 5 was used to launch TM01 wave at 1.42 GHz and complex reflection coefficient measured. The launcher used a rectangular top hat and a monopole with helical structure. A simple matching network was added at the input to the launcher to bring the magnitude of reflection coefficient and phase variation with change in water level at manageable values. The water level was changed between 1 ml to 11 ml in steps of 1 ml that translated to the maximum water level of 39 mm and steps of 3.6 mm. The reflection coefficient, plotted in polar co-ordinates for various values of water level is shown in FIG. 10. The points '1 ml' and '11 ml' correspond to the respective volumes and a clear monotonicity in the trajectory with respect to volume is observed. If the height of the liquid column exceeds the guide wavelength, information from more than one frequency is necessary to determine the level unambiguously.

What is claimed is:

1. A method for monitoring a level of content inside a container, the method comprising:
    transmitting a radio frequency (RF) signal through the container, the radio frequency signal transmitted from a bottom of the container using a launcher;
    measuring the magnitude and phase of a reflected signal with reference to the transmitted signal; and
    correlating the level of content inside the container with the measured magnitude and phase information;
    wherein the container with content acts as a dielectric waveguide and can support propagating electromagnetic waves through a bulk of the content without the need for electrically conducting electrodes to guide the electromagnetic waves;

wherein the propagation is carried out in transverse magnetic mode, transverse electric mode, or hybrid mode, or a combination thereof;

and wherein more than one mode can be used to improve sensitivity, linearity, and dynamic range.

2. The method of claim 1 wherein the container may contain liquid or solid in powdered or granulated form.

3. The method of claim 1 wherein the radio frequency (RF) signal is sinusoidal or stepped sinusoidal over a band of frequencies wherein multiple frequencies are used to remove ambiguity in measurements and optimize the sensitivity over an entire range of content levels.

4. The method of claim 1 wherein the radio frequency (RF) signal transmitted from the bottom of the container is reflected at a content-air interface creating a reflected wave component.

5. The method of claim 4 wherein the magnitude and phase information of the reflected wave component can be obtained by a reflectometer comprising directional couplers, and amplitude and phase comparators implemented in analog, digital or a combination thereof.

6. The launcher of claim 1 comprising:
   a monopole element constructed from a straight electrically conducting element, or a combination of straight, helical, or spiral electrically conducting elements;
   an electrically conducting ground plane; and
   an electrically conducting hat on the monopole in the form of a circle, rectangle or other suitable shape.

7. A non-invasive sensing system for monitoring an amount of content in at least one container comprising:
   a tray for supporting the at least one container;
   a source for generating a radio frequency signal;
   at least one launcher associated with said at least one container supported by said tray for launching the radio frequency signal;
   circuitry in communication with said at least one launcher for transmitting the radio frequency signal into said at least one container and receiving a portion of the radio frequency signal reflected at a content-air interface in the at least one container; and
   circuitry for processing the received portion of the reflected radio frequency signal and determining the amount of content in the at least one container;
   wherein said circuitry in communication with said at least one launcher includes a monopole element in communication with an electrically conducting ground plane and an electrically conducting hat mounted to said monopole element.

8. The non-invasive sensing system of claim 7, wherein said at least one launcher associated with said at least one container supported by said tray is embedded within said tray.

9. The non-invasive sensing system of claim 7, wherein said monopole element may be a straight element, a helical element, or a combination of both straight and helical elements.

10. The non-invasive sensing system of claim 9, wherein said electrically conducting hat may be rectangular or circular.

11. The non-invasive sensing system of claim 9, wherein the radio frequency signal is launched between said ground plane and said monopole element.

12. The non-invasive sensing system of claim 7, wherein said electrically conducting hat is mounted on top of said monopole element.

13. The non-invasive sensing system of claim 12, wherein said monopole element may be a straight element, a helical element, or a combination of both straight and helical elements.

14. The non-invasive sensing system of claim 13, wherein said electrically conducting hat may be rectangular or circular.

15. The non-invasive sensing system of claim 14 wherein the radio frequency signal is launched between said ground plane and said monopole element.

16. The non-invasive sensing system of claim 7, further comprising a switching network to selectively connect each of said at least one launcher with said circuitry for processing the received portion of the reflected radio frequency signal and determining the amount of content in the at least one container; and wherein said processing circuitry includes a reflectometer.

17. A system for monitoring a level of content inside a plurality of containers comprising:
   a tray having a smooth surface and mounted on or attached to an existing shelf system, said tray supporting the plurality of containers;
   multiple launchers for launching electromagnetic waves through a bottom of each of the plurality of containers, each launcher serving one of the plurality of containers;
   a switching network for selectively connecting each launcher with a measurement apparatus including a radio frequency source and a reflectometer; and
   a calibration arrangement having at least one reference device located in close proximity to one of said multiple launchers, and at least one switch for switching between said at least one reference device and said one of said multiple launchers, said calibration arrangement for determining an effect of said switching network and transmission lines using a magnitude and phase of a reflected wave from said one of said multiple launchers and said at least one reference device.

* * * * *